United States Patent
Chang

(10) Patent No.: US 10,057,373 B1
(45) Date of Patent: Aug. 21, 2018

(54) ADAPTIVE COMPUTATION AND FASTER COMPUTER OPERATION

(71) Applicant: Palantir Technologies Inc., Palo Alto, CA (US)

(72) Inventor: Nicholas Chang, San Carlos, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/655,732

(22) Filed: Jul. 20, 2017

Related U.S. Application Data

(60) Provisional application No. 62/506,474, filed on May 15, 2017.

(51) Int. Cl.
*H04L 29/08* (2006.01)
*G06F 17/30* (2006.01)

(52) U.S. Cl.
CPC ...... *H04L 67/327* (2013.01); *G06F 17/30592* (2013.01)

(58) Field of Classification Search
CPC ................................................. H04L 67/327
See application file for complete search history.

(56) References Cited

U.S. PATENT DOCUMENTS

| | | | |
|---|---|---|---|
| 5,515,488 A | | 5/1996 | Hoppe et al. |
| 9,686,086 B1 * | | 6/2017 | Nguyen ............... H04L 12/1822 |
| 2008/0201748 A1 * | | 8/2008 | Hasek ................ H04N 7/17309 |
| | | | 725/98 |
| 2009/0007101 A1 * | | 1/2009 | Azar ..................... G06F 9/4881 |
| | | | 718/1 |
| 2013/0275381 A1 * | | 10/2013 | De Schrijyr ........ G06F 11/1076 |
| | | | 707/652 |
| 2014/0053091 A1 | | 2/2014 | Hou et al. |
| 2014/0280056 A1 | | 9/2014 | Kelly |
| 2014/0282160 A1 | | 9/2014 | Zarpas |
| 2014/0282163 A1 * | | 9/2014 | MacKinlay ............ G06Q 10/10 |
| | | | 715/769 |
| 2015/0324371 A1 * | | 11/2015 | Guo .......................... G06F 3/06 |
| | | | 707/693 |
| 2016/0134723 A1 * | | 5/2016 | Gupta ................. H04L 67/2828 |
| | | | 709/247 |

(Continued)

OTHER PUBLICATIONS

Zaharia, M. et al., "Resilient Distributed Datasets: A Fault-Tolerant Abstractions for In-Memory Cluster Computing," [Proceedings of the 9th USENIX Conference on Networked Systems Design and Implementation, 2012, 14 pages.*

(Continued)

*Primary Examiner* — Jerry B Dennison
(74) *Attorney, Agent, or Firm* — Knobbe, Martens, Olson & Bear, LLP

(57) ABSTRACT

A datacenter has more computing power than a personal computer. The personal computer sends a request to perform an operation on a data set to the datacenter. The datacenter evaluates various inputs to determine if, despite the datacenter's computing power, the personal computer is likely to complete the operation faster. Based on the determination, the datacenter may perform the operation, send the data set to the personal computer for the personal computer to process, or start a competitive computation. As a result, a user interface can be more responsive. Machine learning processes can be used to improve predictions.

20 Claims, 9 Drawing Sheets

(56) References Cited

U.S. PATENT DOCUMENTS

2017/0206372 A1* 7/2017 Jung ............... G06F 17/30864
2017/0262196 A1* 9/2017 Hirose ............... G06F 3/0617

OTHER PUBLICATIONS

Brooks et al., "Hoptrees: Branching History Navigation for Hierarchies," 2 Sep. 2013, Network and Parallel Computing, pp. 316-333.
"SAP BusinessObjects Explorer Online Help," Mar. 19, 2012, retrieved on Apr. 21, 2016, http://help.sap.com/businessobject/product_guides/boexir4/en/xi4_exp_user_en.pdf.

* cited by examiner

ADAPTIVE COMPUTATION AND FASTER COMPUTER OPERATION

INCORPORATION BY REFERENCE AND PRIORITY APPLICATIONS

This disclosure references various and claims priority to U.S. Provisional Patent Application No. 62/506,474, filed on May 15, 2017. The entirety of this provisional application is hereby made a part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

TECHNICAL FIELD

The present disclosure relates to adapting techniques of computer systems to improve the response speeds of user interfaces to both small and large scale data operations.

BACKGROUND

Software interfaces can frustrate users with slow responses. It can be desirable to improve the response speeds of computers.

SUMMARY

The systems, methods, and devices described herein each have several aspects, no single one of which is solely responsible for its desirable attributes. Without limiting the scope of this disclosure, several non-limiting features will now be discussed briefly.

In various embodiments, large or small amounts of data are automatically and dynamically calculated in different ways in response to user inputs, and the calculated data is efficiently and compactly presented to a user by the system. Thus, in some embodiments, the user interfaces of systems described herein respond faster than other systems that do not use the technology and teachings disclosed herein.

Additional embodiments of the disclosure are described below in reference to the appended claims, which can serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

In various embodiments, a system is disclosed, the system comprising: a plurality of processors, a plurality of storage devices configured to store a data set, and a network communication interface configured to receive a request from a personal computer to perform an operation on the data set. The system can be configured to: determine a size the data set, determine that the size is less than a threshold amount, and transmit the data set to the personal computer in response to receiving the request to perform the operation on the data set and based at least in part on determining that the first portion is less than a threshold amount.

In various embodiments, the system can have any combination of the following features. The system is further configured to: determine a hardware specification of the personal computer, and transmit the data set to the personal computer in response to receiving the request to perform the operation on the data set and based at least in part on: determining that the first portion is less than a threshold amount, and the hardware specification of the personal computer. The system is further configured to: transmit the data set to the personal computer in response to receiving the request to perform the operation on the data set and based at least in part on at least two of: determining that the first portion is less than a threshold amount, a type of operation being performed, a type of data being operated on, an identity of a user making the request to perform the operation, or an identity of the personal computer. The system is further configured to: perform the operation on the data set using the plurality of processors in response to receiving the request to perform the operation on the data set, and transmit a result of the operation to the personal computer. The system is further configured to: determine whether the system performed the operation on the data set before the personal computer locally performed the operation on the transmitted data set. The system is configured to perform the operation on the data set by executing a large scale data processing engine. The plurality of storage devices are setup with a fault-tolerant configuration, and the plurality of processors are configured to perform the operation tolerant of a failure by at least one processor of the plurality of processors. The system has at least one of: more raw processing power, more RAM, more storage capacity, or better redundancy than the personal computer.

In various embodiments, a method is disclosed, the method comprising: receiving, through a network interface, a request from a personal computer to perform a processing operation on a data set; determining a size of the data set; determining that the size is less than a threshold amount; and transmitting the data set to the personal computer in response to receiving the request to perform the processing operation on the data set and based at least in part on determining that the size is less than a threshold amount.

In some embodiments, the method can have any combination of the following features. The method further includes: determining a hardware specification of the personal computer, wherein transmitting the data set to the personal computer is further based at least in part on: the hardware specification of the personal computer. Transmitting the data set to the personal computer is further based in part on at least two of: determining that the first portion is less than a threshold amount, a type of operation being performed, a type of data being operated on, an identity of a user making the request to perform the processing operation, or an identity of the personal computer. The method further includes: performing the processing operation on the data set using a plurality of processors in response to receiving the request to perform the processing operation on the data set, and transmitting a result of the processing operation to the personal computer. The method further includes: receiving a time that the computer locally finishes performing the operation on the transmitted data set. Performing the processing operation further includes executing a large scale data processing engine. The method further includes: reading the data set from storage devices setup with a fault-tolerant configuration, wherein performing the processing operation further includes performing the processing operation using a plurality of processors that are configured to perform the operation tolerant of a failure by at least one processor of the plurality of processors. The request from the personal computer includes one or more keys that references values of the data set.

DETAILED DESCRIPTION

Overview

Users can have personal computers such as smartphones, laptops, and desktops. The users can use a software interface to request that an operation be performed on a data set. An example software interface is included in FIG. 1 and discussed further below. The data set can be remotely stored at a datacenter.

Figure 4:
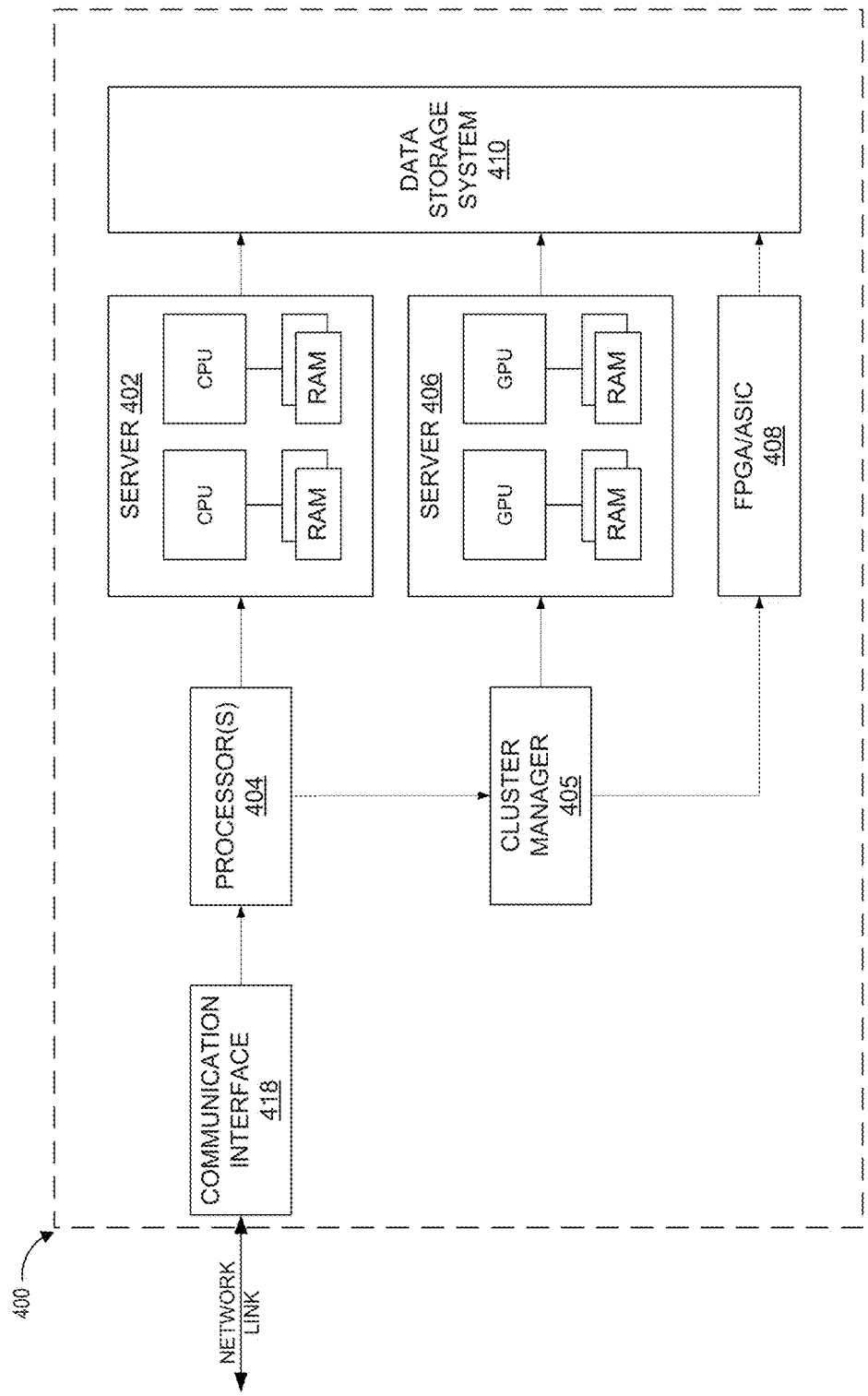
FIG. 4 is a block diagram that illustrates an example datacenter.

The datacenter can be configured for large scale processing of large volumes data. An example datacenter is shown in FIG. 4 and discussed further below. The datacenter may, for example, include a plurality of processors including special purpose processors such as GPUs, ASICs or FPGAs. The datacenter can have tens, hundreds, or thousands of gigabytes of RAM or more; terabytes, petabytes, or more of data storage; etc. The hardware can be arranged in a fault tolerant configuration. The datacenter can use one or more large-scale data processing engines, such as Spark or Hadoop, to perform operations. In response to receiving a request to perform an operation on a data set (e.g., count the number of times a particular IP address was found in the past 100,000,000 network transactions for an entire network), the datacenter can efficiently use its resources to process the request. This can include, for example, a computer dividing the requested operation into multiple parts for performing in parallel (e.g., dividing the log of 100,000,000 into 100 portions of 1,000,000 transactions each) and communicating each part of the operation to a respective computer for processing in parallel (e.g., communicating with 100 different processors to instruct each respective processor which portion of the log to search for the particular IP address). This can, for complex operations on large data sets, greatly increase computational efficiency with parallel processing.

However, the techniques used for complex transactions can introduce small overhead delays that, while insubstantial compared to the time required to perform complex operations, can cause frustration to users performing simpler operations on simpler data sets. As an example, a user can request that a search for a particular IP address be performed on a log of 100 transactions. This might be done in 1 second by a single processor. However, a datacenter might be configured to divide the operation into 100 smaller jobs (taking 0.1 seconds) and then sequentially communicate a job to each of the 100 processors (each taking 0.1 seconds, for 10 seconds total) to compare a line in the transaction log to the particular IP address. Then, each processor performs the comparison (in 0.01 seconds per processor in parallel). The overhead costs (about 10.21 seconds) of such processing algorithms can take longer than directly performing the computation. The example times are provided solely for aiding conceptual understanding and not intended to be limiting.

Network latency in datacenters is another example of an overhead delay. In some example systems, network latency is the greatest contributor to datacenter latency. In datacenters, one computer can send data to another computer via high-capacity links. However high-capacity links have latencies that are greater than the latencies associated with data transmission within one computer or within a processor. Additionally, some datacenters use special communication protocols that may, for example, include duplicative communications, hashing, signal timeouts, retries, etc. These communication protocols may allow windows of time for data transmissions between two computers in a datacenter. These protocols and transmission windows can contribute to overhead latency in a datacenter.

In some embodiments, datacenters can be configured for high availability. However, high availability configurations can also cause overhead delays. For example, data operations may be spread across datacenter racks, buildings, and even geographic regions to mitigate the risks of power outages and natural disasters. Accordingly, signals take longer times to travel across the longer distances between each system in a high availability datacenters. Additionally, each piece of intermediate transmission equipment for signal repeating, amplification, routing, retries, etc. across long distances may introduce further overhead delays. The longer distances between systems in a high availability datacenter causes a relatively small amount of delay in communications. However, multiple small delays can add up and create a significant difference in a user's overall experience.

In some embodiments, resource contention can contribute to overhead. For example, a datacenter may divert computing resources away from a current job, allocating those computing resources to other jobs. Resource contention can exacerbate the latencies in high availability datacenters, causing faraway operations to take a longer time. This can be exacerbated by suboptimal configurations of cloud resources. For example, in a datacenter configured to give newer users' jobs a higher priority than existing users' jobs, users may continuously steal resources from one another and end up making very little progress. The embodiments discussed herein can be used in conjunction with a datacenter having any latency or configuration discussed herein.

Figure 1:
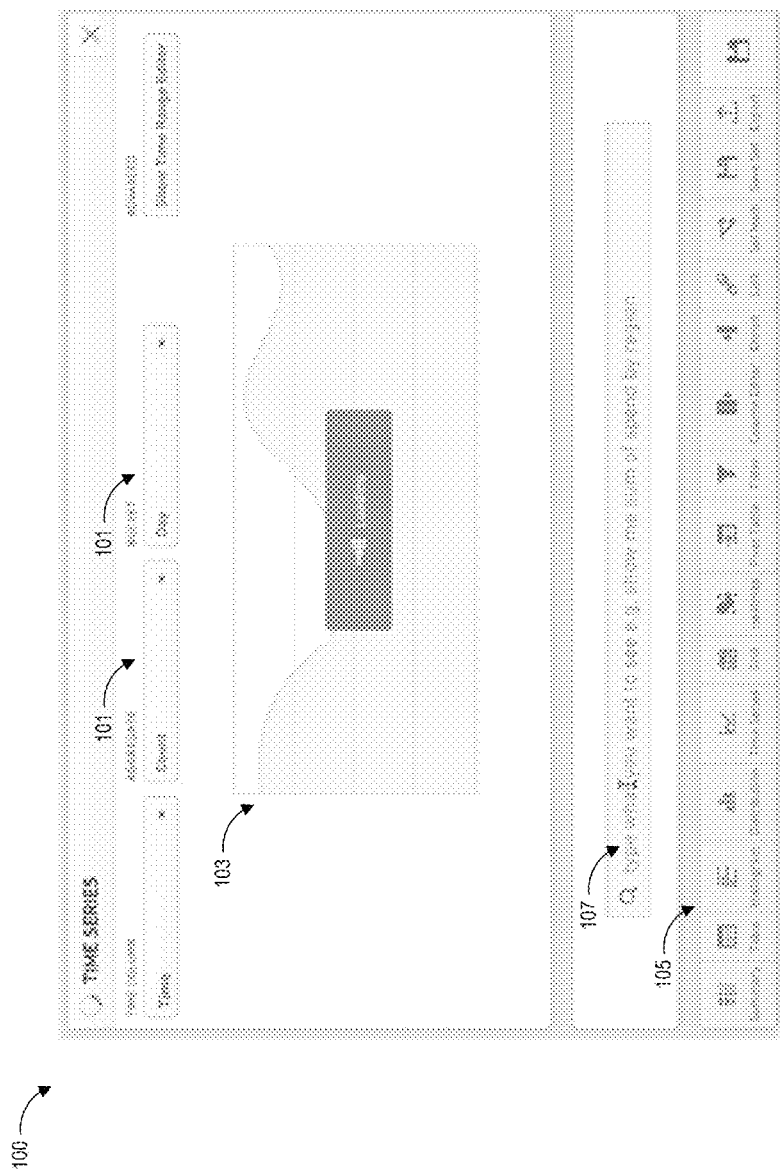
FIG. 1 shows an example user interface.

A system can include a user interface, such as shown in FIG. 1, through which a user submits operations to be performed on a data set stored in a datacenter. The operation is sent to a datacenter. The datacenter can determine the size (actual or estimated) of the data set. Based on the size of the data set and other inputs such as the complexity of the operation, the user, estimates of whether the data set will be used again, and other inputs, the datacenter can handle the operation differently.

If the data set is large and/or the operation is complex, then the datacenter can perform the operation on the data set using techniques for processing large volumes of data. This can include, for example, communicating with and allocating the operation among multiple processors.

If the data set is small and/or the operation is simple, then in response to receiving the request to perform the operation on the data set, the datacenter can transmit the data set to the user's personal computer instead of performing the operation on the data set. The user's personal computer, in response to receiving the data set from the datacenter as the reply to the original request to perform the operation on the data set, can locally process the transmitted data set. This can include performing the operation on the data set as the data set is streamed from the datacenter to the personal computer and refreshing the user interface as the operations are performed on the streaming data set to display streaming results. Despite a computer or a user sending an instruction to a datacenter to perform the operation, the datacenter can determine that, in view of the many overhead costs discussed above, the operation can actually be performed faster on the user's personal computer. Accordingly, the numerous sources of overhead latency can sometimes be avoided. This can result in faster performance of computer operations and an improved user experience.

The computing power of personal computers is limited by both the hardware of the personal computer and by software limits. For example, a spreadsheet program running locally on a user's personal computer may support spreadsheets up to maximum sizes of about $2^{20}$ (about 1 million) rows by $2^{14}$ (about 16 thousand) columns. However, even within the limits set by such spreadsheet programs, depending on the operation being performed and the size of the spreadsheet, a personal computer might take much longer than a datacenter to perform an operation. Different inputs affecting the speed of the personal computer are discussed herein.

Based on the operation and/or size of the data set, the datacenter can both 1) perform the operation on the data set and 2) transmit the data set to the personal computer for the personal computer to perform the operation. This way, both the datacenter and the personal computer can perform the operation in parallel. The personal computer can then use the result from the faster of the datacenter or the personal computer. As a result, the user interface can more quickly display the results of the operation requested by the user.

Machine learning processes can be implemented to predict, based on users, datacenter capabilities, personal computer capabilities, the operation, and the data size, whether the operation will be completed faster in the datacenter or by the personal computer. The processing times by the personal computer and by the datacenter can be fed back into the machine learning processes to improve future determinations of whether the personal computer or the datacenter will complete operations faster.

Example User Interface

FIG. 1 shows an example user interface (UI) 100. The example user interface 100 will now be described to provide a framework for the following discussion of specific systems and methods described herein. The user interface can include one or more query parameters 101, resulting visualizations 103, tool options 105, and input control 107.

The sample user interfaces can be displayed, for example, via a web browser (e.g., as a web page), a mobile application, or a standalone application. For example, an application interface can be displayed in a browser window, and the application can be coded as HTML and JavaScript files. The sample user interface can also be displayed on any suitable personal computer, such as a cell/smart phone, tablet, wearable computing device, portable/mobile computing device, desktop, or laptop, and are not limited to the samples as described herein. Such user interactions can include clicks with a mouse, typing with a keyboard, touches and/or gestures on a touch screen, voice commands, physical gestures made within a proximity of a user interface, and/or the like. The example user interface 100 is not intended to be limiting. Additional example user interfaces and corresponding functionalities are described in U.S. Patent Application No. 62/436,906 at least in reference to FIGS. 1A-1M, 2A-2B, and 12-14, which are included as an appendix to U.S. Provisional Patent Application No. 62/506,474.

The data analysis UI 100 can be part of an application that allows data analysts to queries data sets and to view query set results. The query set results can be presented via the highly interactive user interface display elements and controls. Results of performing operations on data sets can be displayed in a summary view, histogram, time series, time grid, heat map, pivot table, set viewer, table view, etc. The user interface can show various tools 105 for performing different types of operations on data sets.

In response to user interactions, the software can build and run an operation to obtain and display results of a data query. For example, the user can select a time series graphical data visualization on a data set. Once the user has selected the time series graphical data visualization option, menus 101 can be displayed to allow the user to select one or more query parameters specifying the desired output result and format. The user can select, for example, to count a number of occurrences of an event per day and display the result as a graph over time. For example, an analyst for a store may want to analyze sales logs to show how many of a particular product sold each day. As another example, a network security consultant may want to show how many times an IP address was accessed each day. Other data visualization elements described herein can have similar or other menu options for the user to specify query parameters for the respective data visualization. Based on the user's selected query parameters, the UI sends a request to perform one or more operations on one or more data sets.

Some queries can require performing operations on large data sets before the result can be determined. Accordingly, the output visualization can display a "loading" or similar graphic while an operation is being performed on a data set. Users can understand that it takes time to process large data sets, for example, searching through an entire year of logs. However, users also expect very fast responses (e.g., a few seconds, 2 seconds, 1 second, or faster) when processing small volumes of data (e.g., a small log of a single day), and can become frustrated by slow responses caused by datacenter overhead processing times.

When the result of the operation is determined, the user interface can then display the resulting visualization 103. In some embodiments, the visualization 103 is updated in real time as the results are determined.

The input control 107 allows the user to type a query such as "show me count by day." However, before the user finishes typing the text, the system can provide suggestions of visualizations/or filtering associated with those visualizations before an entire search string is entered. For example, the system can predict characters that are going to be typed by the user. The prediction or suggestion can be based on a real-time analysis of the user input and scanning for certain keywords which can indicate or otherwise suggest that the user is interested in a particular set of data which can be well suited for one or more data visualization types. For example, the word "count" in the user input can signal to the system that the user is probably interested in viewing a time series, and thus a particular data visualization option or thumbnail in the dropdown list can be highlighted so that the user can see that the "time series" data visualization is recommended and/or available for the particular user input or query. As another example, the user input can be "histogram rate code" which can in turn signal the system that the user is probably interested in viewing a histogram; then the histogram option or thumbnail can be highlighted for the user to more easily select. The visualization prediction provided in response to text provided into input control 107 can be influenced by the time series that was previously displayed. Thus, as with other examples discussed herein, operations on the data set and subsequent visualizations based on such filtering can build upon one another in a sequential fashion to provide various granularities, types, and sets of information to the user in various available visualizations. For example, if a user begins typing to indicate that a distribution visualization is desired, such that the system can automatically begin pre-calculating (in some embodiments) a distribution visualization based on a previous data sets.

Data analysts can use interfaces, such as shown in FIG. 1, to explore large volumes of data to identify discrete pieces of information and intelligence. Examples of operations that data analysts can perform include sorting and filtering through a massive volume of internet proxy traffic data, cyber security data, telephone data, and/or any other type of data. The data analyst can begin with a large set of data, submit one or more queries which can lead to smaller sets of data results or filtered data results, and then merge or join smaller sets of data results to formulate larger sets of data, exclude subsets of data, and so on in as many iterations as the data analysts desires or finds useful. A high volume data set, such as Internet proxy data, which can include trillions of rows of data corresponding to Internet communication events even over a short period of time. The data analyst can pursue a data analysis path that involves applying a filter, joining to another table in a database, viewing a histogram, manipulating a pivot table, and finally viewing a summary of the entries located which match the parameters of the data analysis path.

The user interface can show the results of operations performed by the data analyst. The results can be provided to data visualization tools to be shown in different ways. For example, the user interface can display the outputs of data visualization tools as a data summary view; a time series view; a time grid view; a heat map view; a pivot table view; an ability to link to another table in a database; etc.

The user interface can include rich user interface controls which are configured to respond to user interaction and input in a manner that allows the non-technical user to quickly and intuitively create complex data set queries. For example, in a histogram view data visualization UI, when a user selects (e.g., by clicking on, touching, speaking, etc.) a column in the histogram, a query filter can be automatically determined and applied to a subsequent query to be processed by the data analysis system. Or, in another example, an interactive heat map overlaid on a geographic region can allow the user to click and/or touch-and-drag to select a region of interest, and in response a query filter can be automatically generated which specifies the region of interest as a matching parameter. Subsequent queries can be easily built and executed to automatically apply the filter specified by the user interaction with the various data visualizations, providing a highly responsive, intuitive, and immersive user experience. In some embodiments, an application can generate and format an operation in response to user inputs.

The technology described in this specification can be used to improve the speed at which the example user interface 100 responds to user inputs. Techniques are provided to reduce the latency before the visualization 103 display a result in response to the user input. By reducing the loading time, users have less frustration and a generally improved user experience.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Datacenter: A system including computer systems and supporting components. Datacenters are usually located at a facility, area, or other center that provides infrastructure for the computer systems, however, some datacenters can be distributed and networked. Datacenters usually include computer systems with greater computation power and storage capacity than personal computers. Datacenters can feature servers, redundant data storage, communication connections between components, etc., however not every datacenter necessarily has any particular feature.

Personal Computer: As used herein, "personal computer" is used to refer to "personal" computing devices such as smartphones, laptops, tablets, desktops, and user terminals. The term "personal" refers to a type of computing device that is typically used by an individual, in contracts with a datacenter. A "personal" computer does not need to be "personally owned" by an individual. Personal computers can include, for example, a computer at a public library accessible by any library patron.

Operation: Any command(s), including multistep commands, that manipulates data or generates a result based on data. Examples of basic operations include other arithmetic operations (e.g., adding, subtracting, multiplying), Boolean operations (e.g., AND, OR, XOR, NOT), etc. Examples of more complex operations include counting, filtering, joining, determining information for making a visualization graph, queries, sorting, etc. Certain computer instructions, such as jump (or other processor-internal instructions), read (or other instructions that do not manipulate data or generate results), and other instructions for which it does not make sense to apply teachings of the disclosure, can be excluded from the meaning of the term "operation" as used herein.

Overview of Example Methods

Figure 2:
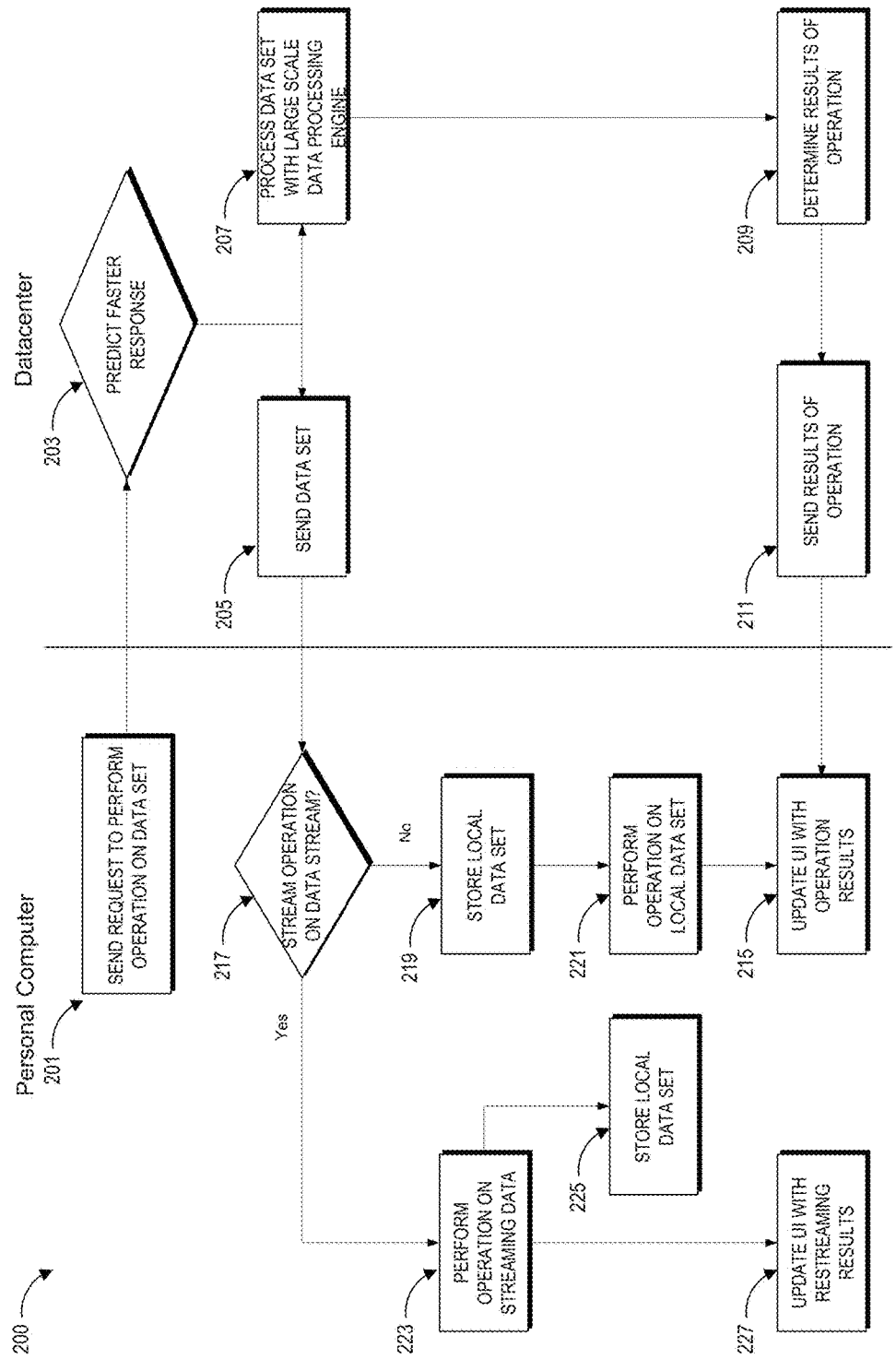
FIG. 2 shows a flowchart of an example method for updating a user interface.

FIG. 2 shows a flowchart 200 of an example method for updating a user interface. In the example method, a personal computer and a datacenter dynamically allocate the processing of data for faster response times. The left side of FIG. 2 indicates blocks performed by a personal computer. The right side of FIG. 2 indicates blocks performed by a datacenter.

At block 201, the personal computer sends a request to perform an operation on a dataset. The operation can include, for example, filtering a data set, modifying a data set, requesting information for displaying a histogram based on a data set, to generate other visualizations based on a data set, to perform mathematical operations on a data set, etc. The personal computer can send the request to the datacenter through a network, including the internet. In some embodiments, a datacenter can reference data sets and/or values of data sets through key/values, and the request can include one or more keys to retrieve the values or datasets.

At block 203, the datacenter predicts whether datacenter processing or personal computer processing would result in a faster response. Further details of block 203 are subsequently described with respect to FIG. 6, FIG. 7, and FIG. 8. It can be predicted that the operation can be more quickly performed by the personal computer or that the operation can be more quickly performed by the datacenter. In some embodiments, it can be predicted that the operation can be performed at approximately similar speeds by the datacenter and by the personal computer.

In response to either 1) determining that the datacenter can perform the operation faster and/or 2) determining that both the personal computer and the datacenter could perform the operation at similar speeds, then the datacenter processes the data set using a large scale data processing engine at block 207. Examples of large scale data processing engines include Spark and Hadoop.

If the data set is processed at the datacenter, then at block 209, the datacenter determines the results of the operation.

At block 211, the datacenter sends the results of the operation to the personal computer.

At block 215, the personal computer can use the result to update the user interface (e.g., to graph to visualization 103 in FIG. 1).

In response to either 1) determining that the personal computer can perform the operation faster and/or 2) determining that both the personal computer and the datacenter could perform the operation at similar speeds, then the datacenter sends the data set to the personal computer at block 205.

At block 217, the personal computer can determine if the operation can be performed on a data stream. For example, an operation can be to determine a number of occurrences that an IP address is accessed each day over a period of 10 days, and the operation result can be graphed as a visualization (e.g., visualization 103 in FIG. 1). As the data is streamed in day by day, the number of occurrences each day can be counted and graphed without waiting for subsequent days. In contrast, an operation to encrypt a data set can require hashing together different parts of the data set such that the hash function cannot be performed until the entire data set is received. In some embodiments, a user can interact with the user interface as the user interface updates with results in block 215. For example, an operation can be to determine a number of occurrences that an IP address is accessed each day over a period of 10 days, and the operation result can be graphed as a visualization (e.g., visualization 103 in FIG. 1). As the data for the first two days is received by the personal computer and the user interface is updated to graph the values for the first two days, the user can mouse over the graph to see a number displaying the result for each day, can use the values for the first or second days in a subsequent operation, etc. By providing a faster, more responsive user interface and allowing interaction more quickly, a user feels that the application is more responsive.

If the operation cannot be performed while data is streaming, then at block 219, the personal computer receives the data set and stores a local copy. This can be stored, for example, in the random access memory of the personal computer and/or on a hard drive. From the application perspective, the data set can be stored in application memory. If the application is executing in a browser, then the data set can be stored in browser memory.

At block 221, the personal computer can perform the operation on the data set and determine a result.

At block 215, the result can be used to update the user interface (e.g., to graph to visualization 103 in FIG. 1).

At block 223, if the operation can be performed on streaming data, then the operation is performed as the personal computer receives the data set from the datacenter as streaming data.

At block 227, the user interface is updated with streaming results (e.g., visualization 103 in FIG. 1 is generated as each data point on the graph is determined).

At block 225, the streaming data can be stored as a local cache to the personal computer, such as in RAM and/or on a hard drive such that a complete data set is accessible to the personal computer for subsequent operations. From the application perspective, the data set can be stored in application memory. If the application is executing in a browser, then the data set can be stored in browser memory.

In some embodiments, an operation can be performed on streaming data without storing a local data set. For example, an operation can be performed to generate a histogram in the user interface based on an underlying data set. A histogram can be generated based on the results of the operation. The underlying data does not need to be stored in the local memory of the personal computer, especially if the personal computer has insufficient capacity to do so.

Example Personal Computer

Figure 3:
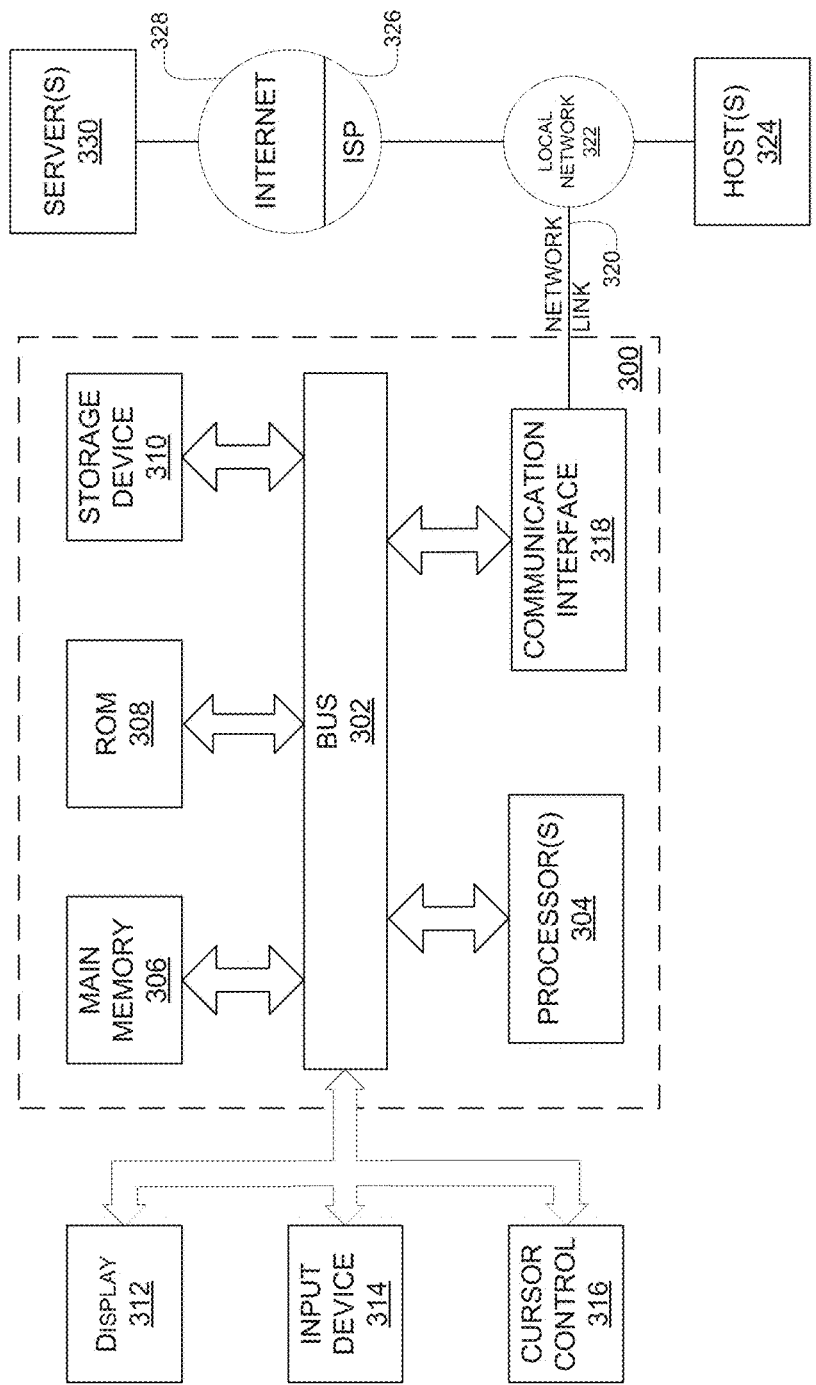
FIG. 3 is a block diagram that illustrates an example personal computer.

FIG. 3 is a block diagram that illustrates an example personal computer. Computer system 300 includes a bus 302 or other communication mechanism for communicating information, and a hardware processor, or multiple processors, 304 coupled with bus 302 for processing information. Hardware processor(s) 304 can be, for example, one or more general purpose microprocessors.

Computer system 300 also includes a main memory 306, such as a random access memory (RAM), cache and/or other dynamic storage devices, coupled to bus 302 for storing information and instructions to be executed by processor 304. Main memory 306 also can be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or universal serial bus (USB) thumb drive (Flash drive), etc., is provided and coupled to bus 302 for storing information and instructions.

Computer system 300 can be coupled via bus 302 to a display 312, such as a cathode ray tube (CRT) or liquid crystal display (LCD) display (or touch screen), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. In some embodiments, the same direction information and command selections as cursor control can be implemented via receiving touches on a touch screen without a cursor.

Computing system 300 can include a user interface module to implement a graphical user interface (GUI) that can be stored in a mass storage device as computer executable program instructions that are executed by the computing device(s). Computer system 300 can further, as described below, implement the techniques described herein using customized hard-wired logic, one or more application specific integrated circuits (ASICs) or field programmable gate arrays (FPGAs), firmware and/or program logic which in combination with the computer system causes or programs computer system 300 to be a special-purpose machine. According to one embodiment, the techniques herein are performed by computer system 300 in response to processor(s) 304 executing one or more sequences of one or more computer readable program instructions contained in main memory 306. Such instructions can be read into main memory 306 from another storage medium, such as storage device 310. Execution of the sequences of instructions contained in main memory 306 causes processor(s) 304 to perform the process steps described herein. In alternative embodiments, hard-wired circuitry can be used in place of or in combination with software instructions.

Various forms of computer readable storage media can be involved in carrying one or more sequences of one or more computer readable program instructions to processor 304 for execution. For example, the instructions can initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 can optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 can be an integrated services digital network (ISDN) card, cable modem, satellite modem, or a modem to provide a data communication connection to a corresponding type of telephone line. As another example, communication interface 318 can be a local area network (LAN) card to provide a data communication connection to a compatible LAN (or WAN component to communicated with a WAN). Wireless links can also be implemented. In any such implementation, communication interface 318 sends and receives electrical, electromagnetic or optical signals that carry digital data streams representing various types of information.

Network link 320 typically provides data communication through one or more networks to other data devices. For example, network link 320 can provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

In some embodiments, the personal computer can communicate with a datacenter through network link 320. The datacenter can, for example, act as a host 324 on a local network or can act as a server 330 over the internet 328.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code can be executed by processor 304 as it is received, and/or stored in storage device 310, or other non-volatile storage for later execution.

Example Datacenter System

FIG. 4 is a block diagram that illustrates an example datacenter 400. The datacenter can include components such as processors 404, RAM, storage devices, communication interface 418, network link, etc. previously described with respect to FIG. 3. FIG. 4 also includes a server 402 with CPU's that have respective memory, a server 406 with GPU's that have respective memory, specially designed computing devices such as FPGAs or ASICs 408, a cluster manager 405, and a data storage system 410. In the datacenter 400, the servers 402, 406 and FPGA/ASIC 408 can be distributed computing resources.

The communication interface 418 can transmit and receive communications to/from the personal computer across a network and/or the internet. The datacenter can receive, for example, requests to perform operations on data sets. The datacenter can transmit, for example, data sets and/or the results of performing operations on data sets.

One or more processors 404 can act as masters or drivers. The one or more processors, along with a cluster manager 405, communicate with servers 402, 406, and/or FPGA/ASIC 408 to perform operations. The servers 402, 406, and/or FPGA/ASIC 408 can act as workers or slaves. In the datacenter, the processors, servers, cluster manager, etc. can be configured with a fault tolerant arrangement. For example, processors can retry commands, masters can reassign tasks to non-faulty workers, processing logs can be used for execution consistency and to recover from processing faults, etc.

A data storage system 410 can store data including the data set that the operation is requested to be performed on. The data set can be stored in a high availability data system.

The cluster manager 404 can manage computing resources such as CPU's, GPU's, special purpose computing machines, memory, disk space, etc. Based on the available computing resources, the processors 404 and/or cluster managers 405 can divide an operation into smaller jobs to be performed in parallel by available computing resources. Computing resources at various levels, such as the CPU level, the server level, the cluster level, etc. can cache copies of the data set or parts of the data set for performing an allocated job. Results can be written back coherently to the data storage system. The results of smaller jobs on parts of the data set can be used to determine the result of the entire operation on the data set.

Figure 6:
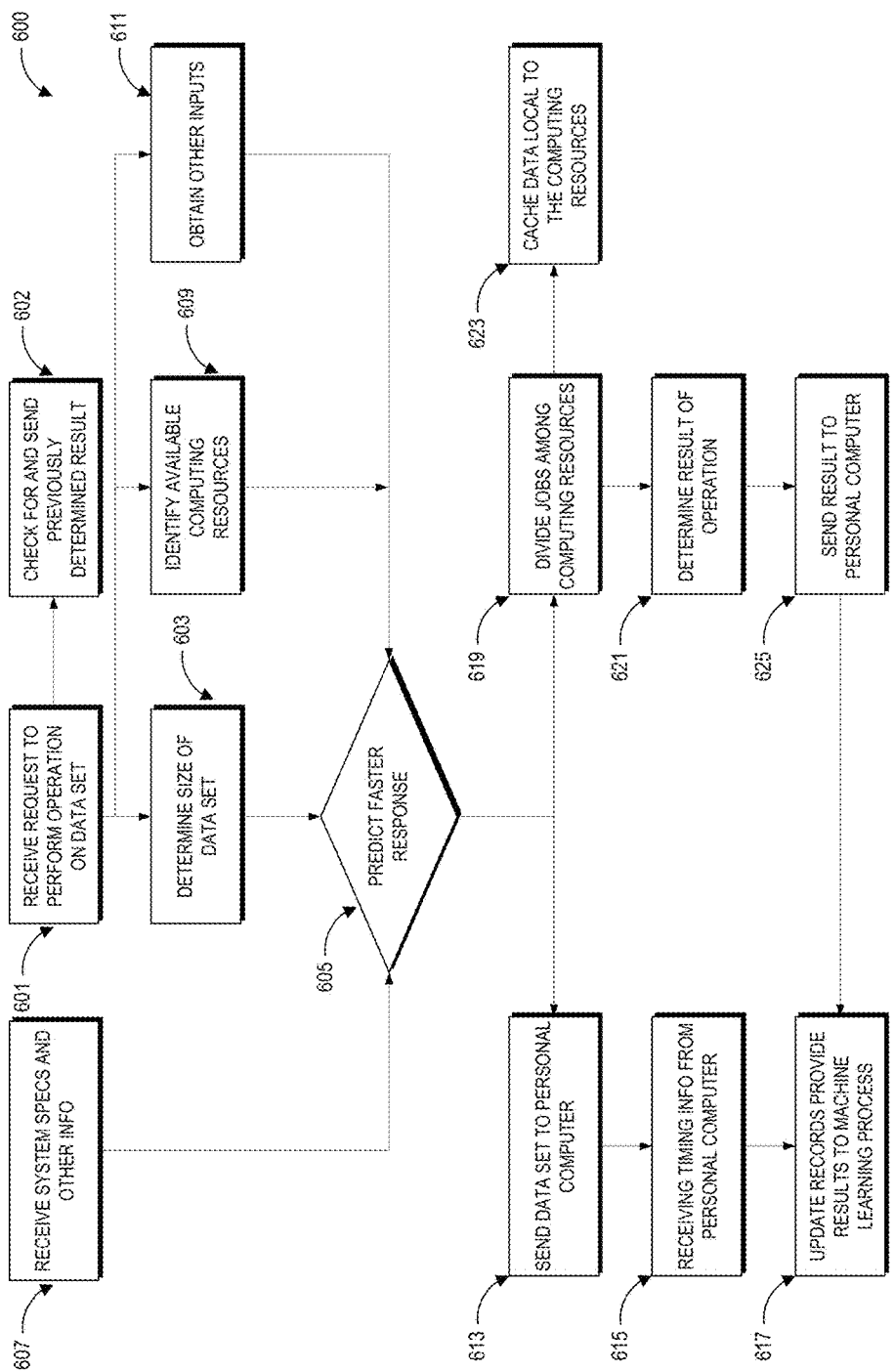
FIG. 6 shows a flowchart of an example method performed by a datacenter.
Figure 8:
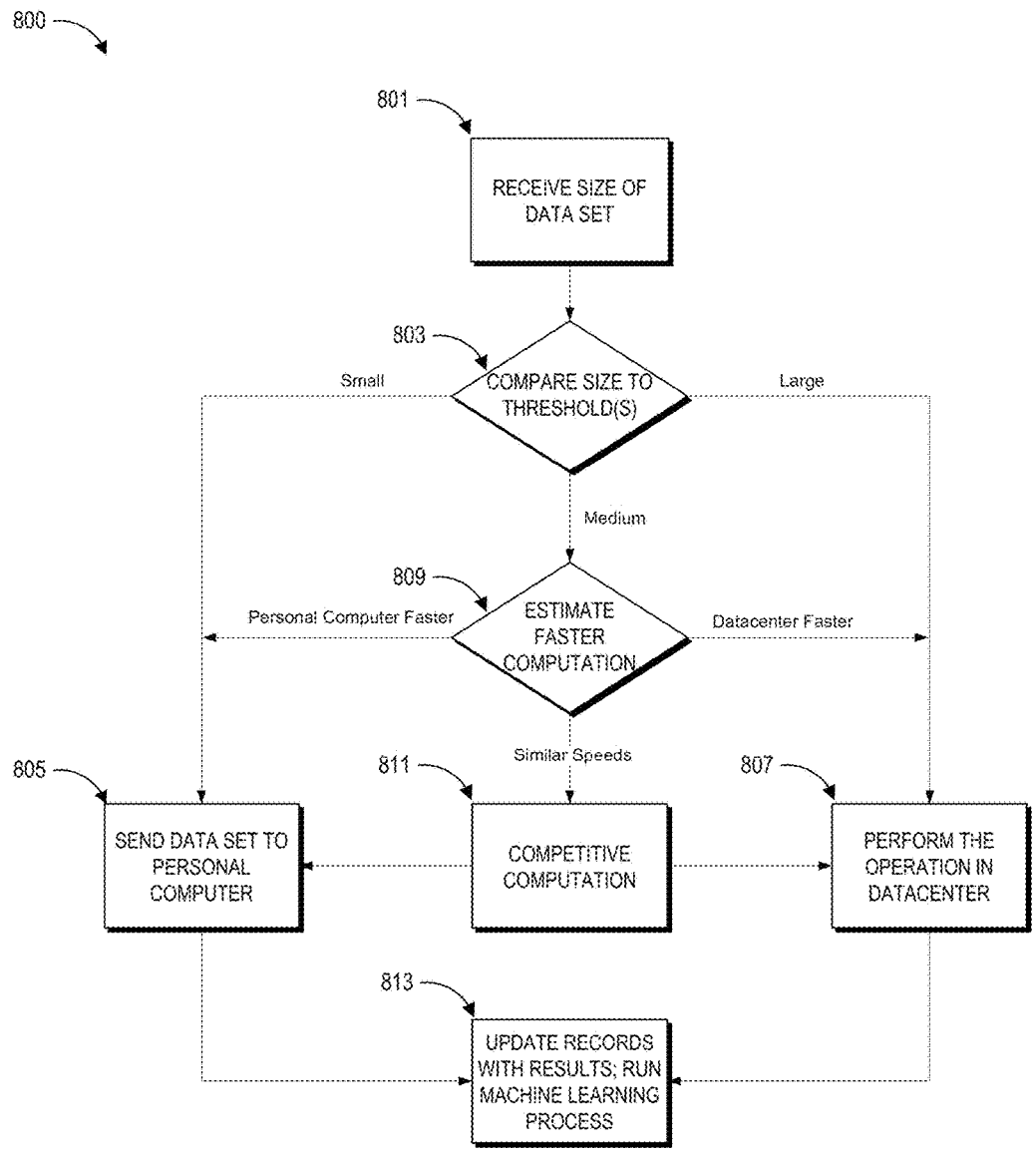
FIG. 8 shows a flowchart of an example method for determining a faster response.

The processor 404 can, in response to receiving the request to perform an operation on a data set, perform parts of the method described in FIG. 6 and FIG. 8 and/or cause other clusters or workers to perform parts of those methods.

Example Sources of Datacenter Overhead Latency

A datacenter (such as datacenter 400 in FIG. 4), can be configured for performing operations on large data sets faster than a personal computer can. However, the configuration of the datacenter can cause overhead delays in processing. These overhead delays can make the datacenter seem slow to respond.

A datacenter can have a data storage system (such as data storage system 410 in FIG. 4) configured for high availability. High availability data systems can include multiple disks or storage devices with a striped, redundant, and/or fault tolerant configuration. Data can be stored in multiple locations such that data will not be lost as a result of a fault at one location. Data on failed disks can be mirrored on other disks and/or recovered through parity schemes or from data available on other disks. However, high availability features contribute to overhead. For example, instead of reading/writing data to/from a single disk, a high availability data system can read/write to both disks and then take additional time to perform a parity check.

A datacenter can have a server system configured for high availability. Similar to high availability configurations of data storage systems, one or more servers can feature redundant processing and/or redundant processors. Some high availability processing techniques can also contribute to overhead. For example, instead of simply having a processor perform an operation to modify an data set, a log entry can be made that a processor will perform the operation on the original data set, then the processor performs the operation and write the results as a new data set, then the processor confirms that the operation completed successfully, and then the log is updated to indicate that the operation completed successfully with the results stored as the new data set. Other examples of overhead include running heartbeat protocols.

A datacenter can use data coherency protocols to make data consistent across processors, servers, and multiple levels of memory. For example, when a request to read data from a disk is received at a coherency manager in a datacenter, instead of immediately reading the data from the disk, the coherency manager can check the coherency status of the data, whether from a directory and/or from other processors/servers/clusters to ensure coherency before reading the data. The coherency manager can take time to confirm the coherency of data, for example, by evicting data, snooping, waiting on data in an exclusive state, etc.

A datacenter can have multiple tiers of cache, and managing each level of cache can contribute to overhead delays. For example, cache can include multiple levels of internal cache such as L1-L2 cache, shared local cache among multiple processors, CPU-level RAM, server level RAM or disk cache, multiple levels of cache in a data storage system, and data available remotely over a network connection.

A datacenter can have numerous components that communicate to each other over different connections. For example, cluster managers can communicate to clusters of servers. Servers can communicate with other servers. Servers can communicate with data storage systems. A datacenter can also communicate over a remote network connection to a remote datacenter. Each link in a chain of communicate can take time.

A cluster manager can perform operations to allocate jobs among computing resources such as CPU's and memory of one or more servers. There can be multiple levels of cluster management.

A datacenter can be configured with a large scale processing engine such as Spark, Hadoop, MapReduce, Dryad, LINQ, NAIAD, GraphX, Pregel, GraphChi, Giraph, Graphlab, Cassandra, etc. The various large scale processing engines can impose various protocols that contribute to overhead latency.

A server can have overhead delays in job management and allocation. For example, in response to receive a request to perform an operation on a data set, a datacenter can determine available computing resources, break the operation into various smaller jobs, and then communicate the jobs to one or more computing resources before any job is processed.

Each of the example features contributing to overhead delay can provide important database functions such as high availability, stability, and faster processing of large data sets. It can be counter intuitive that, when a personal computer is configured to send request to perform operations on data sets to a datacenter because the datacenter has much greater computing power, data capacity, fault tolerance, and algorithms designed to optimize computing speeds, that the faster solution can be to send the data set back to the personal computer for the personal computer to perform the operation. It can be overlooked that, for small data sets, the features of a datacenter designed to speed up processing can in fact slow down the processing of small data sets. Accordingly, some techniques disclosed herein can make use of a datacenter's large scale computational resources in some cases and avoid one or more sources of overhead delay in other cases so that a user interface can respond more quickly to user's request to perform an operation.

Example Methods

Figure 5A:
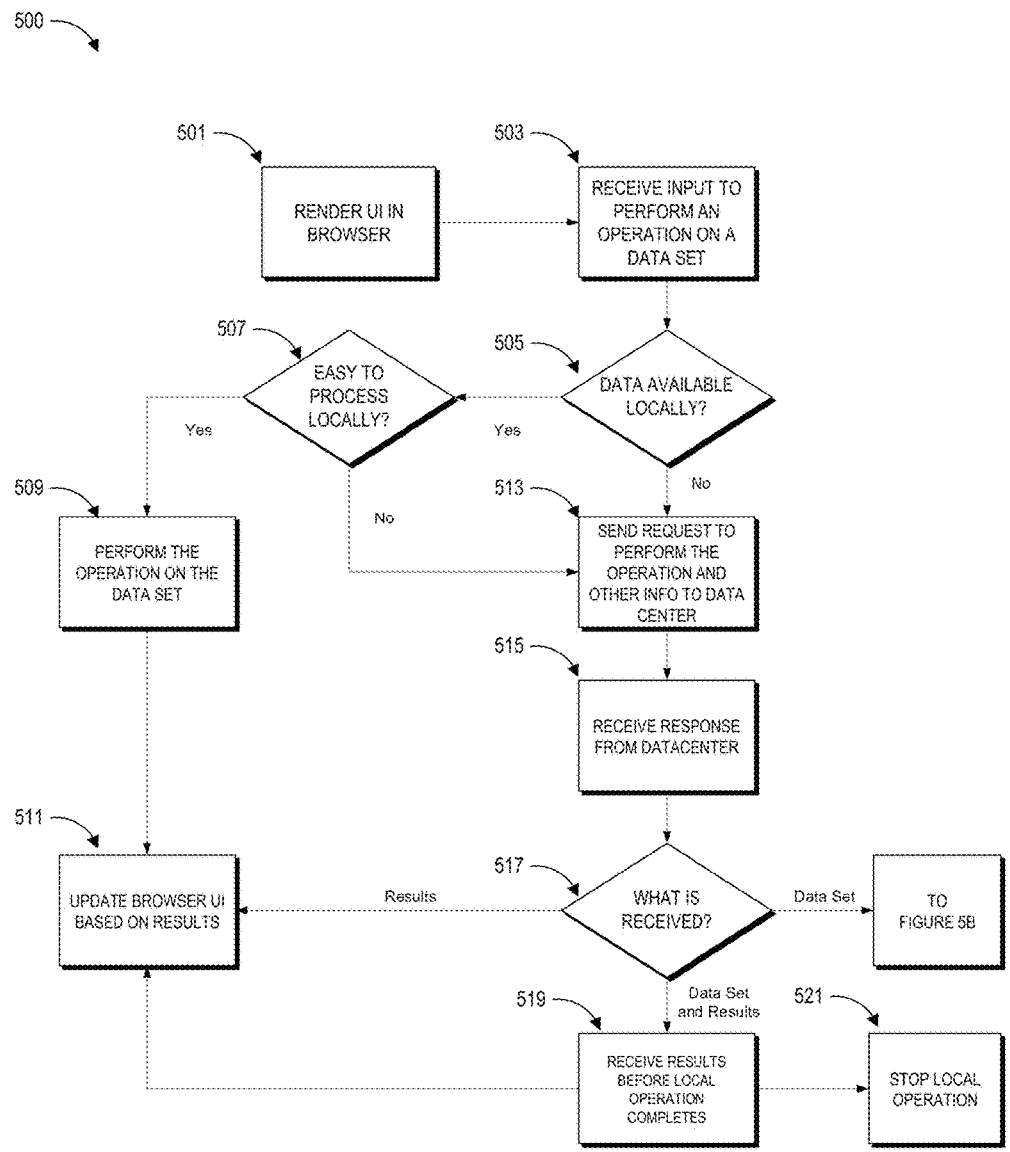
FIG. 5A and FIG. 5B show a flowchart of an example method performed by a personal computer.
Figure 5B:
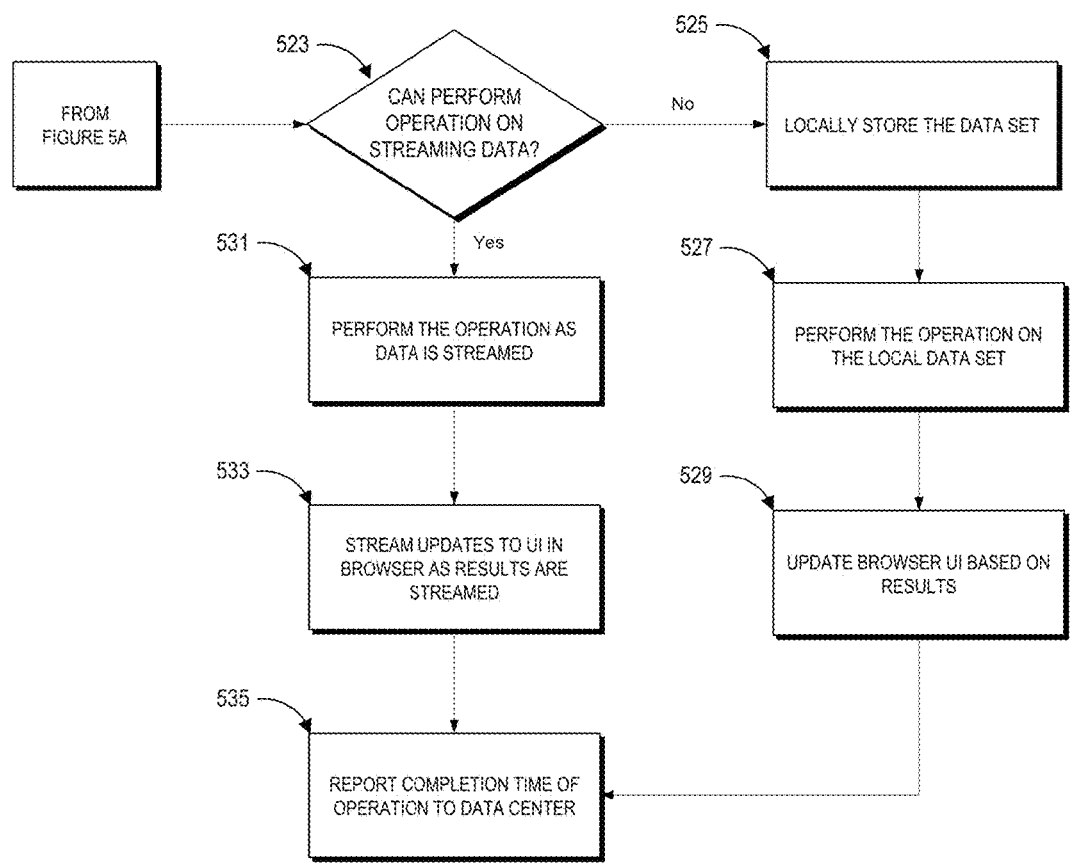

FIG. 5A and FIG. 5B show a flowchart of an example method 500 performed by a personal computer.

At block 501, a user interface can be displayed in a browser. In some embodiments, the user interface can be displayed in an application.

At block 503, user input is received. The user input can indicate an operation to perform on a data set. In some embodiments, an application can translate a user's inputs (e.g., clicking a button, typing text, selecting a menu item) into a computer operation.

At block 505, it is determined if the data set is available locally. For example, the data set might have been previously provided to and cached in the memory or hard drive of the personal computer. If the data is available locally, then block 505 can proceed to block 507. If the data is not available locally, then block 505 can proceed to block 513.

At block 507, it can be determined if the operation can easily be processed locally. This can be determined based on the type of operation being performed, as well as on the hardware capabilities of the personal computer. For example, operations to count, filter, add, perform simple logic, perform arithmetic, etc. can generally be done by a CPU, and block 507 can proceed to block 509. 2D and 3D rendering operations can generally be performed by a GPU if the personal computer has a GPU, and block 507 can proceed to block 509 if the personal computer includes a GPU, otherwise block 507 can proceed to block 513. Other operations, such as machine learning, decryption, complex scientific formulas, sorting, graph traversal analysis, optimizations, and simulations can be more difficult for a personal computer to perform, and block 507 can proceed to block 513. In some embodiments, block 507 can be skipped, and the operation is performed locally by the personal computer at block 509 if the data is locally available to the personal computer at block 505.

After the personal computer performs an operation on a data set, the personal computer can immediately or eventually provide the results of the operation to the datacenter, especially when data is modified, as part of a data coherency system.

At block 509, the personal computer can perform the operation on the data set and determine the result of the operation.

At block 511, the personal computer can display the user interface in the browser based on results. In some embodiments, parts of user interface can be updated as results become available. This can improve the response speed of the user interface for streaming data.

At block 513, a request can be sent from the personal computer to the datacenter to perform an operation on a data set. A request can include one or more operations and one or more data sets. At block 513, the personal computer can also send other information, such as system specifications of the personal computer, to the datacenter.

At block 515, the personal computer can receive a response from the datacenter.

At block 517, the personal computer determines the type of response received from the datacenter. If a result is received, then block 517 can proceed to block 511. In some embodiments, if a data set is received, then block 517 can proceed to block 523. In some embodiments, if a data set is received and the results are subsequently received, then block 517 can proceed to block 519.

In some embodiments, a datacenter can first send a data set to the personal computer, and the personal computer can begin performing the operation on the data set. This can occur as part of a "competitive" computation, where the datacenter also begins to perform the operation on a copy of the data set available to the datacenter. The datacenter sends the results to the personal computer as a stream and/or when the datacenter completes the operation. The personal computer can receive the results at block 519. From block 519, the personal computer can stop performing the operation locally at block 521 if the results are received from the datacenter before the personal computer finishes performing the operation, and the personal computer can update the user interface in the browser based on the results at block 511.

At block 523, the personal computer can determine if the operation can be performed as the data set is streamed from the datacenter. If not, then block 523 can proceed to block 525. If the operation can be performed as data is streamed, then block 523 can proceed to block 531.

At block 525, the personal computer receives the data set and stores a local copy. This can be stored, for example, in the random access memory of the personal computer and/or on a hard drive. The data set can be stored in application memory. If the application is executing in a browser, then the data set can be stored in browser memory, which can improve access speeds for subsequent reads to the data set.

At block 527, the personal computer can perform the operation on the local data set and determine a result.

At block 529, the user interface in the browser can be updated based at least in part on the result.

At block 535, the personal computer can report the completion time of performing the operation on the local data set to the datacenter.

At block 531, the operation can be performed as the data set is streamed from the datacenter.

At block 533, the user interface in the browser is updated as results are determined. This can be done as a stream to reduce the "loading" time before the user interface first responds to a user's input, even if only the user interface is updated to display only partial results.

FIG. 6 shows a flowchart of an example method 600 performed by a datacenter.

At block 601, the datacenter receives a request to perform an operation on a data set.

At block 602, a datacenter can check to see if the requested operation was previously performed on the data set. This can happen, for example, when a different user previously requested to perform the same operation on the same dataset. The datacenter can keep logs of operations performed on data sets and reference the logs to determine if the same operation was previously performed on the same data set so that the result can be located and sent to the personal computer without performing the operation again.

At block 603, the datacenter can determine the size of the data set. This can include estimating the size of the data set. The size can be determined, for example, by determining actual disk size of the data set. Estimating the size of a data set can include, for example, any of: determining the dimensions or number of elements in the data set, multiplying an average size of an item in a data set by the number of elements in the data set, looking up records indicating the size of the data set, etc. Size can be measured, for example, in bits, bytes (and scaled multiples thereof such as megabytes, gigabytes, etc.), rows, columns, number of values, etc.

At block 605, the datacenter can predict if the user interface can respond faster if the datacenter performs the operation or if the datacenter sends the data set to the personal computer for the personal computer to perform the operation. This can be based at least in part on the size of the data set. Other inputs to block 605 can include system specifications and other information about the personal computer received from block 607, available computing resources identified in block 609, and other inputs from block 611. Determining if the user interface can respond faster if the datacenter performs the operation or if the datacenter sends the data set to the personal computer for the personal computer to perform the operation is further discussed with reference to FIG. 7 and FIG. 8.

Block 605 can be implemented to run quickly in the datacenter. Block 605 can be implemented to run in a datacenter (e.g., datacenter 400 in FIG. 4) on a low latency machine. For example, block 605 can be executed by one or more processors 404 in FIG. 4 in low latency communications with the communication interface 418. As another example, upon receiving the request to perform the operation in block 601, block 605 can be performed by any hardware that can receive one or more inputs to block 605 (e.g., the size of the data set from block 603) with a latency that is less than an average latency between receiving the request to perform the operation and communicating the jobs to computing resources as further discussed below in block 619. In some embodiments, the hardware for performing block 605 can be different from the computing resources discussed with respect to block 619. In some embodiments, the datacenter can perform block 605 using a faster framework or engine that has less overhead latency than the framework or engine used in block 621.

At block 607, system specifications and other information about the personal computer can be received. The system specifications can be sent from the personal computer. In some embodiments, the system specifications can also be retrieved from a memory if previously received. In some embodiments, system specifications can be looked up based on a model number. In some embodiments, system specifications (such as the presence of a dedicated GPU) of the personal computer can be estimated based on the completion times of the personal computer performing operations facilitated by a GPU (such as 2D/3D operations), where long completion times indicate that the personal computer lacks a GPU and is using a CPU in place of the GPU.

At block 609, available computing resources can be identified. In some embodiments, a master or cluster manager can refer to a job schedule or log to determine which resources are currently in use or scheduled for use. In some embodiments, for example, a master or cluster manger can send a broadcast a request for workers to report their capacity and utilization.

At block 611, other inputs helpful for determining a faster response time are obtained. Examples of other inputs are discussed with respect to FIG. 7.

If it is determined that the datacenter can perform the operation on the data set faster, then block 605 can proceed to block 619. If it is determined that the personal computer can perform the operation faster, then block 605 can proceed to block 613. In some embodiments, if the determination is close (e.g., the speeds of the personal computer and datacenter are within a threshold amount) or ambiguous (e.g., performing the operation takes a highly variable and unpredictable amount of time), then block 605 can proceed to both block 613 and block 619.

At block 613, the datacenter sends the data set to the personal computer. This can include streaming the data to the personal computer. Data can be streamed, for example, as serialized data or data as separated values, such as CSV data.

At block 615, the datacenter can receive timing information from the personal computer about how long the personal computer took to complete the operation after the personal computer received the data set.

At block 617, the datacenter can update records and provide results to machine learning processes for predicting which response will be faster. The machine learning processes are further described with respect to FIG. 7 and FIG. 8.

At block 619, the datacenter can determine and divide computing jobs among the available computing resources. The operation can be broken down into a plurality of computing jobs that can be assigned to different computing resources. Efficiently dividing the jobs to be performed in parallel by different computing resources and/or on different parts of a data set can improve processing speeds for large data sets.

At block 621, the result of performing the operation on the data set is determined.

At block 623, parts of the data set can be cached locally to individual computing resources. For example, with reference to FIG. 4, a data set can include phone records of 10,000 individuals, and a first operation can be performed to determine how many total calls were made. Server 402 can be assigned to process a first part of the data set relating to the first 5,000 individuals by reading the first part of the data set from the data storage system 410, counting the number of phone calls made by the first 5,000 individuals, and caching the logs of the first 5,000 individuals in RAM in the process. Server 406 can be assigned to process the phone logs of the remaining 5,000 individuals, read the second part of the data set from the data storage system 410, counting the number of phone calls made by the remaining 5,000 individuals, and caching the logs of the remaining 5,000 individuals in RAM in the process. If a second operation is received to count the text messages sent by the 5,000 individuals, a second, similar allocation of jobs for 5,000 individuals can be performed, and the servers 402 and 406 can perform the jobs using the portions of the data sets that are already cached.

At block 625, the result of performing the operation can be sent to the personal computer.

A personal computer can perform the example method in FIG. 5 and a datacenter can perform the example method in FIG. 6 such that the response speeds of user interfaces can be improved when the personal computer sends requests to the datacenter to perform operations.

Determining the Faster Response

Figure 7:
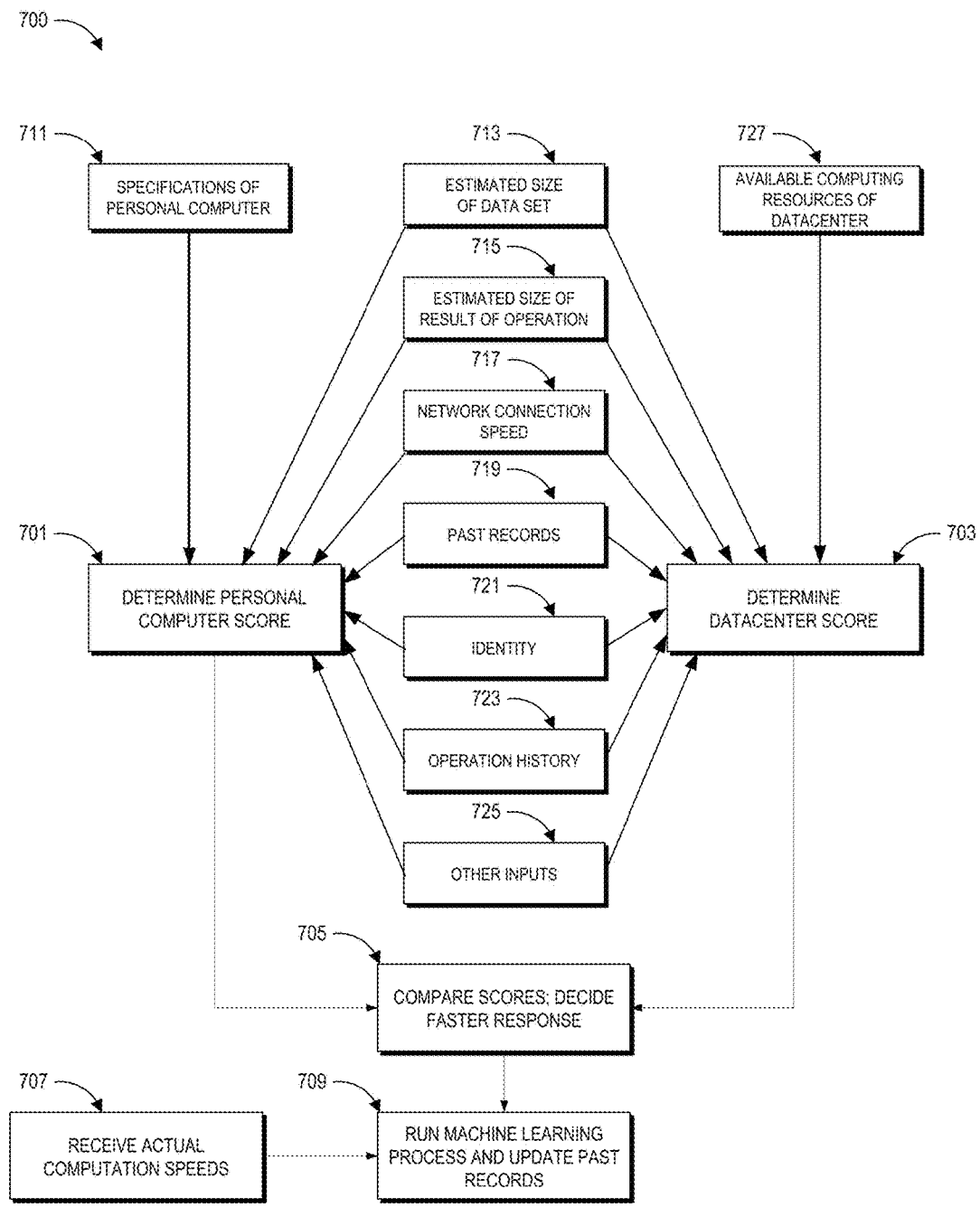
FIG. 7 shows a block diagram of inputs related to predicting a faster response.

FIG. 7 shows a block diagram 700 of inputs related to predicting a faster response. A number of different inputs are provided to determine the personal computer score at block 701 and to determine the datacenter score at block 703. The inputs include specifications of the personal computer 711, a size of a data set 713, an estimated size of a result of performing an operation 715, a network connection speed 717, past records 719, an identity 721, an operation history 723, other inputs 725, and available computing resources of the datacenter.

The specifications of a personal computer 711 can include, for example, processor type, processor speed, processor core count, amount of RAM available, operating system, GPU type, amount of hard drive space, disk transfer speeds, utilization capacity of the personal computer, etc. The specifications of the personal computer can be used to estimate how long it can take to perform an operation. It can be estimated that personal computers with faster processors will complete operations faster, that personal computers with multiple cores can run multithreaded jobs to complete parallel jobs faster, that personal computers with GPU's can run 2D and 3D processing operations faster, etc. It can be estimated that a personal computer can process a data set up to a size similar to the amount of RAM available at a first speed, and that the personal computer will process additional data at a slower speed related to disk operation. The RAM can include, for example, a total amount of RAM installed, an amount of RAM accessible by the operation system, an unused amount of RAM, and/or an amount of RAM allocated to the software application or browser displaying the interface.

The size of the data set 713 can be an actual or estimated size of the data set. The size of the data set can be estimated, for example, any of: determining the dimensions or number of elements in the data set, multiplying an average size of an item in a data set by the number of elements in the data set, looking up records indicating the size of a data set, etc. It can be determined, for example, that on data sets with sizes larger than the available RAM of a personal computer and/or larger than the disk space of a personal computer should be executed in the datacenter. Size can be measured, for example, in bits, bytes (and scaled multiples thereof such as megabytes, gigabytes, etc.), rows, columns, number of values, etc. The threshold size can be a set size or vary based on other inputs shown in FIG. 7 (e.g., free space available on the personal computer, available RAM in the personal computer, network connection speed of the personal computer). The datacenter can generally be faster at processing large data sizes. In some embodiments, the size of the data set can be compared to a first threshold that is relatively large, and operations on data sets having sizes exceeding the first threshold are determinatively assigned to the datacenter without considering other inputs. Due to overhead latencies in datacenter processing, when small data sets are involved, a personal computer can typically perform operations and cause the user interface to respond faster. In some embodiments, the size of the data set can be compared to a second threshold that is relatively small, and operations on data sets having sizes smaller than the second threshold are assigned to the personal computer. In various embodiments, the first threshold and the second threshold can be the same or different thresholds. In some embodiments where the first threshold is larger than the second threshold and the size of the data set falls between the first and the second threshold, other analysis can be performed and/or both the personal computer and the datacenter can perform the operation.

The size of a result of an operation 715 can be used similar to how the size of the data set can be used. The size of the result can be estimated or actual. The threshold size can be a set size or vary based on other inputs shown in FIG. 7 (e.g., free space available on the personal computer, available RAM in the personal computer, network connection speed of the personal computer). As another example, an operation can be to decompress a compressed data set. The data set can be small enough for the personal computer to store in RAM, but the decompression can cause the resulting uncompressed data set to be larger than even the disk space of the personal computer. As another example, a personal computer can have a first, relatively small data set locally stored in the memory of the personal computer. However, if the user requests to perform an operation to join the first data set with a second data set such that a much larger data set will result, then the join operation can be performed by the datacenter.

The network connection speed 717 can affect the decision of whether to perform an operation using the personal computer, the datacenter, or both. Faster network connection speeds allow for data to be transferred more quickly from the datacenter to the personal computer. For example, an operation might be to filter a data set, where the resulting filtered data set is about 20% of the data set. A personal computer might receive the data set in 10 seconds and perform the filter operation for 4 seconds to determine the result for a total of 14 seconds, whereas the a datacenter with a 7 second overhead might filter the data set in 1 second and then transmit the smaller, filtered data set in 2 seconds, for a total of 10 seconds. Accordingly, it can be estimated that the datacenter can perform the operation first. However, if the network connection were ten times faster, then the personal computer can receive the data set in 1 second an perform the operation in 4 seconds (5 seconds total), which would be faster than a datacenter with a 7 second overhead that filters the data set in 1 second and then transmits the smaller, filtered data set in 1 second (9 seconds total).

The past records 719 can include records of how long it took various personal computers of various specifications to perform various types of operations on data sets of various sizes with various types of data when the personal computer had various hardware configurations and capacity. The past records can also include records of how long it took for datacenters to perform various types of operations on data sets of various sizes with various types of data when the datacenter used various computing resources. When a request to perform an operation on a data set is received, the past records can be searched to find the datacenter and personal computer timings for completing the operation. Based on these timings, the faster of the datacenter and personal computer can be selected to perform the operation on the data set. In some embodiments, if the records indicate that the datacenter and the personal computer have similar processing speeds and/or one does not consistently perform similar operations on similar data sets faster than the other, then a competitive computation can be performed.

An identity 721 can include an identity of a user such as a name or username. The identity can also include, for example, identifying information about the personal computer. The identity of the person or personal computer can be used, for example to during a search of past records 719 to look up past performance speeds of similar operations. If, for example, the records indicate that the same personal computer previously performed operations on data sets, then the previous completion timings of operations performed by the personal computer can be used with confidence when estimating completion times of similar operations by the same personal computer because the hardware is likely to be the same. In some embodiments, even when the identity of the personal computer is the same, adjustments can be made, for example, based on the current utilization rate of the computer (e.g., if the personal computer currently has spare memory available). Accordingly, a datacenter can make different decisions of whether to perform the operation, send data, or start a competitive computation for different users and/or different personal computers.

An operation history 723 can be logged and used to predict future operations. The operation history can be logged for each identity 721. The operation history can be used to determine patterns in behavior. The patterns can predict future operations to decide whether an operation should be performed by the personal computer or by the datacenter based on benefits of caching. For example, a user might perform the following operations: find the lowest data value in data set A; find the highest data value in column 1 of data set A; find the lowest data value in data set B; find the highest data value in column 1 of data set B; find the lowest data value in data set C. Based on the pattern, it can be predicted that the next operation will be to find the highest data value in column 1 of data set C. It can be determined that the datacenter, by processing different columns of data set C in parallel, can find the lowest data value substantially faster than the personal computer can. Accordingly, the datacenter might perform the operation to find the lowest data value in data set C. However, it might be further determined that the personal computer can find the highest data value in column 1 of data set C faster than the datacenter if the personal computer already has the filtered set C cached. Accordingly, when finding the lowest data value in data set C, the datacenter can send the data set to the personal computer so that the personal computer can quickly perform the next operation on a copy of data set C in the personal computer's local cache.

Available computing resources 727 can be used to determine how quickly a datacenter can perform an operation. A datacenter with more available computing resources can perform an operation on a data set more quickly than if the datacenter were already at capacity. For example, a datacenter with 100 available processors can perform a highly parallel operation much more quickly by dividing the operation into 100 parallel jobs than if 90 of the processors were already in use and the datacenter could only divide the operation onto 10 parallel jobs.

Other inputs 725 can also be used to determine a personal computer speed/score and/or datacenter speed/score. For example, one input can include a type of operation being performed. Some types of operations take more or less time, and some types of operations can take advantage of parallel computing or ASICs. As another example, some types of operations can require sequential looped jobs that execute thousands, millions, or billions of times. Accordingly, the number of loops for performing the operation can be divided by a processor speed to determine an indication of a completion time for performing the operation. Another example input can include a browser type through which the request to perform the operation is made. Some browsers experience a "bloat" and use more memory due to sandboxing, overhead, etc. Accordingly, any of the other inputs (e.g., size 713) can be affected by a browser bloat input (e.g., 2× browser bloat input for a first browser type and 1.5× for a second browser type).

At block 701, some, all, or any combination of the inputs 711-725 can be used to determine the personal computer score for performing the operation on a data set. In some embodiments, the score can be a computing speed or time for completing the operation. In some embodiments, the score can be adjusted to account for the effects of other inputs shown in FIG. 7. The different inputs can be given different weights. For example, a completion time in a past record for a very similar operation by the same personal computer on a similar type of data set of a similar size can be weighted more heavily than a completion time estimated based on the size of the data set divided by computing speed.

At block 703, some, all, or any combination of the inputs 713-727 can be used to determine the datacenter speed for performing the operation on a data set. In some embodiments, the score can be a computing speed or time for completing the operation. In some embodiments, the score can be adjusted to account for the effects of other inputs shown in FIG. 7. The different inputs can be given different weights.

At block 705, the faster response can be determined. This can include, for example, comparing the personal computer speed/score against the datacenter speed/score. This can include, for example, directly comparing speeds/scores to determine whether the personal computer is expected to be faster than the datacenter. This can also include, for example, shortcut decisions that are evaluated before others. For example, if a data set exceeds 32 GB (or other size inappropriately large for modern personal computers to handle), the datacenter can be assigned to perform the operation without evaluating other inputs because the other inputs will have little effect.

At block 707, actual computation speeds can be received. This can include, for example, the computation speed of the datacenter in performing the operation along with other information, such as the available resources used by the datacenter to perform the operation. This can also include, for example, the computation speed of the personal computer, along with the specifications and/or capacity of the personal computer.

At block 709, the past records can be updated based on the information received at block 707, and the machine learning processes for predicting whether the datacenter or personal computer will have the faster response can incorporate the new information.

FIG. 8 shows a flowchart of an example method 800 for determining a faster response.

At block 801, a size of a data set is received. The size can be an actual size or an estimated size.

At block 803, the size of the data set is compared to one or more thresholds. In some embodiments, the size is compared to one threshold, where block 803 proceeds to either block 805 or to block 807 based on the comparison. In some embodiments, the comparison can be made using a plurality of ranges or thresholds where block 803 proceeds to block 805 if the size is small, block 803 proceeds to block 807 if the size is large, and block 803 proceeds to block 809 if the size is within a medium threshold range.

At block 805, the data set is sent to the personal computer. This can happen in response to determining that the personal computer will likely perform the operation faster (e.g., as a result of block 803 or as a result of block 809). This can also happen, for example, during a competitive computation.

At block 807, datacenter performs the operation and sends the results of the operation to the personal computer. This can happen in response to determining that the datacenter will likely perform the operation faster (e.g., as a result of block 803 or as a result of block 809). This can also happen, for example, during a competitive computation.

At block 809, other inputs can be evaluated to estimate whether the personal computer or the datacenter can perform the operation faster. This can be based on any combination of the inputs shown and described with respect to FIG. 7. In some embodiments, block 809 proceeds to either block 805 or to block 807 based on the determination. In some embodiments, block 809 can also proceed to block 811 if the determination is that the personal computer and datacenter will perform similarly, if the determination is inconclusive, if there is low confidence in the determination, and/or if the type of operation cannot be predicted with accuracy.

At block 811, the "competitive" computation occurs. This happens when block 811 proceeds to both block 805 and to block 807. The data set can be sent to the personal computer so that the personal computer can perform the operation, and at the same time, the datacenter can also perform the operation on the data set. A user interface can be updated based on the results of either the personal computer or the datacenter, whichever is determined sooner.

At block 813, the machine learning processes for predicting a faster computation can incorporate feedback that includes the completion times by the personal computer and/or the datacenter.

Additional Embodiments

In some embodiments, a personal computer sends a request to a datacenter (with greater computing resources than the personal computer but also more overhead latency) to perform an operation on a data set. The datacenter, based on the size of the data set and/or other inputs shown in FIG. 7, either: 1) performs the operation, or 2) sends the data set to the personal computer for the personal computer to perform the operation. For example, if the size of the data is the only criteria, then the size can be compared to a threshold such that small data sets are sent to the personal computer and the datacenter performs operations on large data sets. The personal computer can update a user interface based on the result of the operation.

In some embodiments, a personal computer sends a request to a datacenter (with greater computing resources than the personal computer but also more overhead latency) to perform an operation on a data set. The datacenter, based on the size of the data set and/or other inputs shown in FIG. 7, either: 1) performs the operation, 2) sends the data set to the personal computer for the personal computer to perform the operation, or 3) performs both parts 1) and 2) in a competitive computation. The personal computer can update a user interface based on the result of the operation. In the competitive computation, the personal computer can update the user interface based on first results received.

In some embodiments, a personal computer receives user input indicating a request to perform an operation on a data set. If the data set is locally available, then the personal computer performs the operation on the data set. Otherwise, the personal computer sends the request to perform the operation to the datacenter. If the datacenter sends the data set as a response, then the personal computer performs the operation on the data set (and in some embodiments, streams the operation as the data set is streamed) and updates a user interface based on the response. If the data center sends the response, then the personal computer updates the user interface based on the response from the data center.

In some embodiments, computation speed data can be gathered and provided to machine learning processes for determining personal computer and datacenter computation scores based on any combination of the inputs described with respect to FIG. 7. The personal computer and datacenter computation scores are used to determine a datacenter's response to receiving a request to perform an operation on a data set, which can include any combination of: 1) performing the operation, 2) sending the data set to the personal computer for the personal computer to perform the operation, or 3) performing both parts 1) and 2) in a competitive computation.

As a feature of any embodiment, the personal computer can perform an operation as streaming data is received from the datacenter. The personal computer can update the user interface as streaming results are determined. In some embodiments, the streamed data is not cached by the personal computer beyond completion of the operation.

Additional Implementation Details and Embodiments

Various embodiments of the present disclosure can be a system, a method, and/or a computer program product at any possible technical detail level of integration. The computer program product can include a computer readable storage medium (or mediums) having computer readable program instructions thereon for causing a processor to carry out aspects of the present disclosure.

For example, the functionality described herein can be performed as software instructions are executed by, and/or in response to software instructions being executed by, one or more hardware processors and/or any other suitable computing devices. The software instructions and/or other executable code can be read from a computer readable storage medium (or mediums).

The computer readable storage medium can be a tangible device that can retain and store data and/or instructions for use by an instruction execution device. The computer readable storage medium can be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions can be callable from other instructions or from itself, and/or can be invoked in response to detected events or interrupts. Computer readable program instructions configured for execution on computing devices can be provided on a computer readable storage medium, and/or as a digital download (and can be originally stored in a compressed or installable format that requires installation, decompression or decryption prior to execution) that can then be stored on a computer readable storage medium. Such computer readable program instructions can be stored, partially or fully, on a memory device (e.g., a computer readable storage medium) of the executing computing device, for execution by the computing device. The computer readable program instructions can execute entirely on a user's computer (e.g., the executing computing device), partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions can initially be carried on a magnetic disk or solid state drive of a remote computer. The remote computer can load the instructions and/or modules into its dynamic memory and send the instructions over a telephone, cable, or optical line using a modem. A modem local to a server computing system can receive the data on the telephone/cable/optical line and use a converter device including the appropriate circuitry to place the data on a bus. The bus can carry the data to a memory, from which a processor can retrieve and execute the instructions. The instructions received by the memory can optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. In addition, certain blocks can be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections can be embodied in, and/or fully or partially automated via, electronic hardware such application-specific processors (e.g., application-specific integrated circuits (ASIC s)), programmable processors (e.g., field programmable gate arrays (FPGAs)), application-specific circuitry, and/or the like (any of which can also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, can be referred to herein as, for example, "computers," "computer devices," "computing devices," "hardware computing devices," "hardware processors," "processing units," and/or the like. Computing devices of the above-embodiments can generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices can be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality can be accessible by a user through a web-based viewer (such as a web browser), or other suitable software program). In such implementations, the user interface can be generated by a server computing system and transmitted to a web browser of the user (e.g., running on the user's computing system). Alternatively, data (e.g., user interface data) necessary for generating the user interface can be provided by the server computing system to the browser, where the user interface can be generated (e.g., the user interface data can be executed by a browser accessing a web service and can be configured to render the user interfaces based on the user interface data). The user can then interact with the user interface through the web-browser. User interfaces of certain implementations can be accessible through one or more dedicated software applications. In certain embodiments, one or more of the computing devices and/or systems of the disclosure can include mobile computing devices, and user interfaces can be accessible through such mobile computing devices (for example, smartphones and/or tablets).

Many variations and modifications can be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. can be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and can possibly include such components as memory, input/output devices, and/or network interfaces, among others.

While the above detailed description has shown, described, and pointed out novel features as applied to various embodiments, it can be understood that various omissions, substitutions, and changes in the form and details of the devices or processes illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   a plurality of processors;
   a plurality of storage devices configured to store a data set; and
   a network communication interface configured to receive a request from a personal computer to perform an operation on the data set;
   wherein the system is configured to:
      determine a size of the data set;
      determine that the size is less than a threshold amount;
      in response to receiving the request to perform the operation on the data set and based at least in part on determining that the size of the data set is less than a threshold amount, transmit the data set to the personal computer for the personal computer to perform the operation on the data set;
      perform the operation on the data set;
      determine a time for completing the operation on the data set;
      receive a time that the personal computer completes the operation on the data set;
      store information indicating whether the system completed the operation on the data set before the personal computer completed the operation on the data set, wherein the information is useful for predicting whether the system or the personal computer can process a second operation faster;
      receive, through the network communication interface, a second request from the personal computer to perform the second operation on a second data set;
      determine a size of the second data set; and
      based at least in part on the size of the second data set, an identity of the personal computer, and the information indicating whether the system completed the operation on the data set before the personal computer completed the operation on the data set, perform the second operation on the second data set or transmit the second data set to the personal computer.

2. The system of claim 1, wherein the system is further configured to:
   determine a hardware specification of the personal computer; and
   transmit the data set to the personal computer for the personal computer to perform the operation based on the data set in response to receiving the request to perform the operation on the data set and further based at least in part on:
      determining that the size of the data set is less than a threshold amount; and
      the hardware specification of the personal computer.

3. The system of claim 1, wherein the system is further configured to:
   transmit the data set to the personal computer for the personal computer to perform the operation based on the data set in response to receiving the request to perform the operation on the data set and based at least in part on determining that the size of the data set is less than a threshold amount and further based at least in part on at least one of:
a type of the operation being performed,
a type of data being operated on,
an identity of a user making the request to perform the operation, or
an identity of the personal computer.

4. The system of claim 1, wherein the system is further configured to:
transmit a result of the operation to the personal computer.

5. The system of claim 4, wherein the system is further configured to:
transmit the result of the operation to the personal computer in response to a determination that the system performed the operation on the data set and that the personal computer has not yet completed the operation on the data set.

6. The system of claim 4, wherein the system is configured to perform the operation on the data set by executing a large scale data processing engine.

7. The system of claim 6, wherein:
the plurality of storage devices are set up with a fault-tolerant configuration; and
the plurality of processors are configured to perform the operation tolerant of a failure by at least one processor of the plurality of processors.

8. The system of claim 1, wherein the system has at least one of: more raw processing power, more RAM, more storage capacity, or better redundancy than the personal computer.

9. A method comprising:
receiving, through a network interface, a request from a personal computer to perform a processing operation on a data set;
determining a size of the data set;
determining that the size is less than a threshold amount; and
in response to receiving the request to perform the processing operation on the data set and based at least in part on determining that the size is less than a threshold amount, transmitting the data set to the personal computer for the personal computer to perform the operation on the data set;
performing the operation on the data set;
determining a time for completing the operation on the data set;
receiving a time that the personal computer completes the operation on the data set;
storing information indicating whether the system completed the operation on the data set before the personal computer completed the operation on the data set, wherein the information is useful for predicting whether the system or the personal computer can process a second operation faster;
receiving, through the network interface, a second request from the personal computer to perform the second operation on a second data set;
determining a size of the second data set; and
based at least in part on the size of the second data set, the identity of the personal computer, and the information indicating whether the system completed the operation on the data set before the personal computer completed the operation on the data set, performing the second operation on the second data set or transmitting the second data set to the personal computer.

10. The method of claim 9, further comprising:
determining a hardware specification of the personal computer;
wherein transmitting the data set to the personal computer is further based at least in part on:
the hardware specification of the personal computer.

11. The method of claim 9, wherein transmitting the data set to the personal computer is further based in part on determining that the size is less than the threshold amount and further based in part on at least one of:
a type of the operation being performed,
a type of data being operated on,
an identity of a user making the request to perform the processing operation, or
an identity of the personal computer.

12. The method of claim 9, further comprising:
transmitting a result of the processing operation to the personal computer.

13. The method of claim 12, wherein the result of the processing operation is transmitted to the personal computer before the system receives a time that the personal computer locally finishes performing the operation on the data set.

14. The method of claim 12, wherein performing the processing operation further comprises executing a large scale data processing engine.

15. The method of claim 14, further comprising:
reading the data set from storage devices set up with a fault-tolerant configuration;
wherein performing the processing operation further comprises performing the processing operation using a plurality of processors that are configured to perform the operation tolerant of a failure by at least one processor of the plurality of processors.

16. The method of claim 14, wherein the request from the personal computer includes one or more keys that references values of the data set.

17. The method of claim 9,
wherein the second operation is performed on the second data set based at least in part on the size of the second data set, the identity of the personal computer, and the information indicating whether the system completed the operation on the data set before the personal computer completed the operation on the data set, the method further comprising:
transmitting a result of the second operation to the personal computer.

18. The method of claim 9, wherein
the second data set is transmitted to the personal computer based at least in part on the size of the second data set, the identity of the personal computer, and the information indicating whether the system completed the operation on the data set before the personal computer completed the operation on the data set.

19. The system of claim 1, wherein the system is further configured to:
perform the second operation on the second data set based at least in part on the size of the second data set, the identity of the personal computer, and the information indicating whether the system completed the operation on the data set before the personal computer completed the operation on the data set; and
transmit a result of the second operation to the personal computer.

20. The system of claim 1, wherein the system is further configured to:
transmit the second data set to the personal computer based at least in part on the size of the second data set, the identity of the personal computer, and the information indicating whether the system completed the operation on the data set before the personal computer completed the operation on the data set.

* * * * *